United States Patent [19]

Coughlan

[11] 4,324,473

[45] Apr. 13, 1982

[54] SX-70 FILM PACK WITH BATTERY HOLD DOWN STRUCTURE

[75] Inventor: Edward H. Coughlan, Norwood, Mass.

[73] Assignee: Polaroid Corporation, Cambridge, Mass.

[21] Appl. No.: 193,618

[22] Filed: Oct. 3, 1980

[51] Int. Cl.³ .............................................. G03B 17/26
[52] U.S. Cl. ................................................... 354/276
[58] Field of Search ................ 206/455; 354/219 IF, 354/203, 202, 354, 83, 275, 276, 86, 157, 174

[56] References Cited

U.S. PATENT DOCUMENTS

| | | | |
|---|---|---|---|
| 1,879,498 | 9/1932 | Richards et al. | 354/276 X |
| 2,161,058 | 6/1939 | Kamiss | 354/276 X |
| 3,543,662 | 12/1970 | Erlichman | 354/202 |
| 3,561,339 | 2/1971 | Erlichman | 354/86 |
| 3,643,571 | 2/1972 | Erlichman et al. | 354/354 X |
| 3,705,537 | 12/1972 | Paglia | 354/202 |
| 3,705,542 | 12/1972 | Gold | 354/354 X |
| 3,779,770 | 12/1973 | Alston et al. | 354/86 X |
| 4,072,972 | 2/1978 | Gold | 354/275 |

FOREIGN PATENT DOCUMENTS 1499977  9/1967  France .............................. 354/174

*Primary Examiner*—Donald A. Griffin
*Attorney, Agent, or Firm*—John S. Vale

[57] ABSTRACT

A photographic film pack for use with battery energized photographic apparatus and including a film container having a blocking member therein for capturing an end portion of a flat battery within the container and blocking its movement away from a rear wall of the container in response to an upwardly directed force applied to the battery terminals by resiliently mounted battery contact members in the apparatus which extend into the container through access openings in the rear wall. This construction minimizes the depth of contact penetration required for good electrical contact and increases the tolerances of the shape of battery contact members which may achieve such minimum penetration.

7 Claims, 7 Drawing Figures

SX-70 FILM PACK WITH BATTERY HOLD DOWN STRUCTURE

BACKGROUND OF THE INVENTION

The present invention relates to the field of photography and, more specifically, to an improved photographic film pack or assemblage of the type including a film container holding a supply of individual film units and a flat electrical battery for energizing electrical components of photographic apparatus configured to receive such an assemblage.

The commercially available SX-70 Land film pack or assemblage, manufactured by Polaroid Corporation, Cambridge, Mass., includes a generally box-like molded plastic film container defined by a forward wall having an exposure aperture therein; a rear wall oppositely spaced from the forward wall and having a pair of generally diamond-shaped battery terminal access openings therein; and a peripheral section joining the forward and rear walls and including a pair of side walls, a trailing end wall, and an oppositelyspaced leading end wall having a film withdrawal slot adjacent the forward wall.

When the container is molded, the leading end wall is formed in an open position, as a hinged extension of the rear wall, thereby leaving the leading end of the container open for insertion of the contents. After the contents are inserted through the open end by an automatic stuffing machine, the leading end wall is pivoted to its closed position and is bonded in place.

The contents of the film pack include, in stacked order from the interior surface of the forward wall to the interior surface of the rear wall, a dark slide for temporarily light-sealing the exposure aperture until the pack is loaded into the pack receiving chamber of a camera or camera back, a stack of integral self-developing film units (usually 10), a spring platen, and a substantially flat 6-volt battery having a pair of battery terminals on its underside which are located in facing registration with the access openings in the rear wall of the container.

The spring platen serves two functions. First, it urges the stack of film units upwardly toward the forward wall so that, following removal of the dark slide, the forwardmost film unit in the stack is always urged against the interior surface of the forward wall in position for exposure through the exposure aperture and subsequent advancement through the withdrawal slot by a camera pick mechanism for feeding the film unit into the bite of a pair of motor driven processing rollers. Secondly, the spring platen provides a downwardly directed biasing force on the battery for urging it toward the rear wall to maintain the battery terminals in good electrical contact with a pair of resiliently mounted battery contacts in the camera which extend through the access openings to engage the battery terminals.

For representative examples of such film packs, see commonly-assigned U.S. Pat. Nos. 3,543,662; 3,705,542; and 3,779,770, and copending application U.S. Ser. No. 026,200 filed on Apr. 2, 1979 (now U.S. Pat. No. 4,226,519).

The SX-70 Land film pack is intended for use with several types of battery energized photographic apparatus. These include several highly-automated self-developing cameras such as the SX-70, Pronto! and OneStep and a variety of motor-driven camera backs and special purpose industrial cameras, all manufactured by Polaroid Corporation.

Each such apparatus includes a receiving chamber into which the pack is slidably advanced to a fully inserted operative position and a pair of resiliently-displaceable battery contact members disposed on the bottom or rear wall of the chamber.

Typically, each battery contact member includes an upstanding, longitudinally extending, convexly-bowed leaf spring made of an electrically conductive material such as copper and an upwardly facing battery contact located at the apex portion of the leaf spring. The contact may be integrally formed with the leaf spring and comprise a coined or stamped area where the copper flares out laterally somewhat so that the contact area is wider than the leg portions of the leaf spring. In some commercially available cameras, this wider contact section is additionally coated with a highly-conductive material, for example silver, as disclosed in commonly-assigned U.S. Pat. No. 3,705,537.

As the film pack is inserted into the chamber, trailing end wall first, the trailing end portion of the container rear wall engages the upwardly sloping leaf spring sections, leading to the contacts, and compresses the springs downwardly so that the exterior surface of the rear wall rides over the contacts. As the container approaches the fully inserted position, the lateral distance between the edges of the diamond-shaped access openings becomes progressively larger and near the center of the access openings this distances exceeds the width of the contact thereby allowing the leaf springs to urge the contacts upwardly through the access openings into engagement with the battery terminals. As disclosed in the previously mentioned U.S. Pat. No. 3,705,537, the diamond-shaped access openings cooperate with the bowed leaf spring structure to smoothly cam the contacts into and out of the access openings to facilitate insertion/withdrawal of the film pack.

When the film container is fully loaded with 10 film units, the spring platen is in maximum compression and its spring force pushing downwardly on the battery substantially exceeds the spring force of the battery contact members pushing upwardly on the battery terminals so that the battery is firmly urged and retained against the interior surface of the container rear wall. This means that the depth of penetration of the contacts into the container through the access openings required to make good electrical contact with the battery is at a minimum. However, as the film units are sequentially exposed and withdrawn from the container, the spring platen expands accordingly and the downward force it exerts on the battery progressively decreases as each succeeding film unit is withdrawn. After 7 or 8 film units have been removed, the oppositely-directed spring forces of the spring platen and battery contact members are about in equilibrium. When the next film unit is withdrawn, the battery contact members provide the dominant force and they actually move at least that section of the battery having the terminals thereon upwardly slightly into the container to a new equilibrium position requiring a slightly greater depth of penetration by the battery contacts. Because the bow-shaped leaf springs are substantially longer than the diamond-shaped access openings, the ultimate depth of contact penetration has a limit because those portions of the arcuate leaf springs just forwardly and rearwardly of the contact will engage or "bottom out" on the edges of the access openings.

While the combination of this film pack and battery contact member configurations have proved to be highly reliable in maintaining good electrical contact with the battery while at the same time providing smooth and trouble free insertion/withdrawal of the film pack in millions of cameras and camera backs now in use, there are indications that a very small percentage of these cameras experience electrical failures in the middle of an automatic cycle of operation especially when there are only 2 of 3 film units left in the pack. It is suspected that most of these failures occur because of an interruption in electrical contact between one of the battery contacts and its corresponding battery terminal.

Tests have indicated that this failure can be reproduced when one of the leaf springs bottoms out while the other has sufficient clearance for a greater depth of penetration. In this case, the deeper penetrating battery contact will move the battery upwardly within the container to a point where there is a loss of contact between the battery contact and the facing battery terminal. Because the diamond-shaped opening is molded to great uniformity, it is most probable that this type of failure occurs when the profile shape of one battery contact member deviates (flattens out) substantially from the profile of its mate.

Such deviations in the profile shape of the arcuate battery contact members may be caused by a number of reasons. Because these cameras are manufactured in such high volumes, there will be some manufacturing variations in the tolerance of the leaf spring shape. More likely, however, is the fact that the copper leaf springs are fairly ductile and the configuration of one of these springs may be distorted or flattened out somewhat when the camera is in use in the field. One way this could happen is by the operator trying to jam an improperly oriented film pack into the receiving chamber or inadvertently inserting his fingers or other foreign object into the confines of the receiving chamber.

There have been numerous attempts to alleviate this problem. One proposed solution provides a stiffer spring platen within the container so that the battery is always positively urged against the interior surface of the rear wall against the bias of the battery contact members even when all of the film units have been removed from the container. While this solution minimizes the depth of contact penetration required for good electrical contact and allows a wider range of tolerances of the leaf spring profile configuration which can achieve such minimum penetration, the increased spring force by necessity is also transmitted to the stack of film units. The additional friction between the forwardmost film unit and the interior surface of the forward wall of the film container when the container is fully or almost fully loaded with film units results in a undesirable overloading of the camera pick mechanism which has overcome the increased friction to slide the film unit along the interior surface of the forward wall and through the film withdrawal slot subsequent to exposure.

Another proposed solution is to make the diamond-shaped access opening in the rear wall of the container longer to preclude premature bottoming out of a slightly deformed leaf spring. While this change will allow increase depth of contact penetration, thereby providing increased leaf spring shaped tolerances, the beneficial camming action for moving the contacts smoothly into and out of the access openings is compromised. More importantly, with longer diamond-shaped openings there is a tendency for the wider electrical contact to ride up into the container and become jammed into the narrowing V-section of the trailing end of the access openings thereby preventing withdrawal of the film pack from the chamber.

Therefore, it is an object of the invention to provide an improved photographic film assemblage of the type described having provision for increasing the reliability of maintaining good electrical contact between the terminals of a flat battery in the film container and the battery contact members in photographic apparatus configured to receive such an assemblage.

It is another object to provide such an assemblage wherein the cost of the improvement is low and requires minimal modification to one component of the assemblage and existing manufacturing and assembly equipment.

Another object is to provide such an assemblage which will be more reliable when used with photographic apparatus having one or more battery contact members that may deviate from its original manufactured configuration due to inadvertent distortion.

Other objects of the invention will, in part, be obvious and will, in part, appear hereinafter.

SUMMARY OF THE INVENTION

The present invention provides an improved photographic film assemblage of the type previously described which additionally includes means within the film container for blocking movement of at least that section of the flat battery having the pair of battery terminals thereon away from the rear wall of the film container, in the vicinity of the diamond-shaped battery contact access openings, in response to an upwardly directed force applied to the terminals by the resiliently displaceable battery contact members. This addition minimizes the depth of penetration of the battery contacts into the container required for good electrical contact with the battery terminals and consequently widens the tolerances of the convexly bowed battery contact member leaf springs which can achieve such minimum penetration before portions of the leaf spring legs, fore and aft of the contact at the apex section, engage the edges of the access openings thereby inhibiting further penetration.

In the illustrated embodiment, the blocking means includes at least one integrally molded projection within the film container on the trailing end wall. This projection is spaced above the rear wall so that a peripheral trailing end section of the flat battery may be snugly captured between the projection and trailing end interior surface of the rear wall in response to sliding the stacked contents of the container thereinto through the opening at the leading end.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
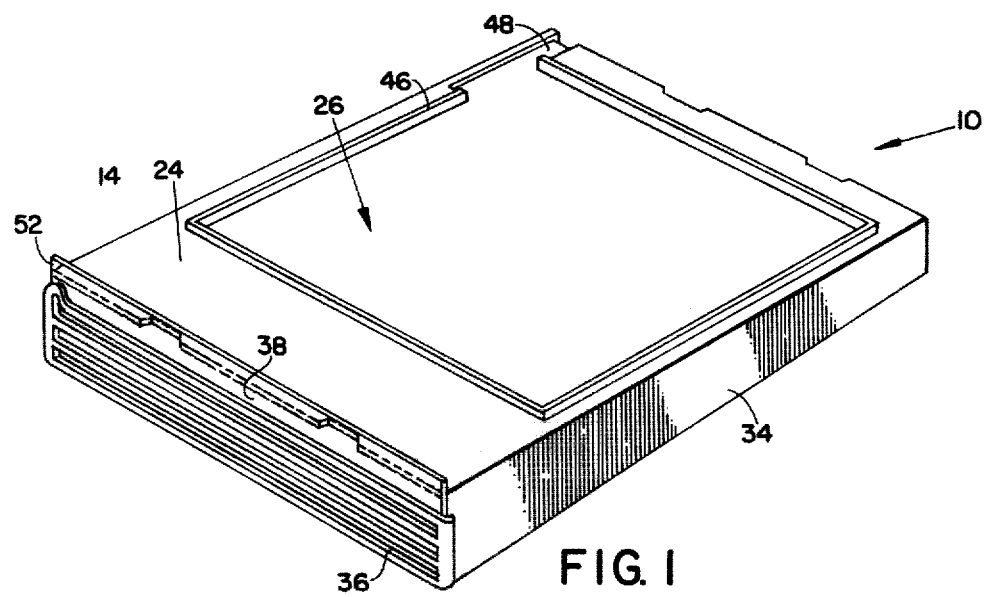
FIG. 1 is a perspective view of a photographic film pack or assemblage embodying the present invention.
Figure 3:
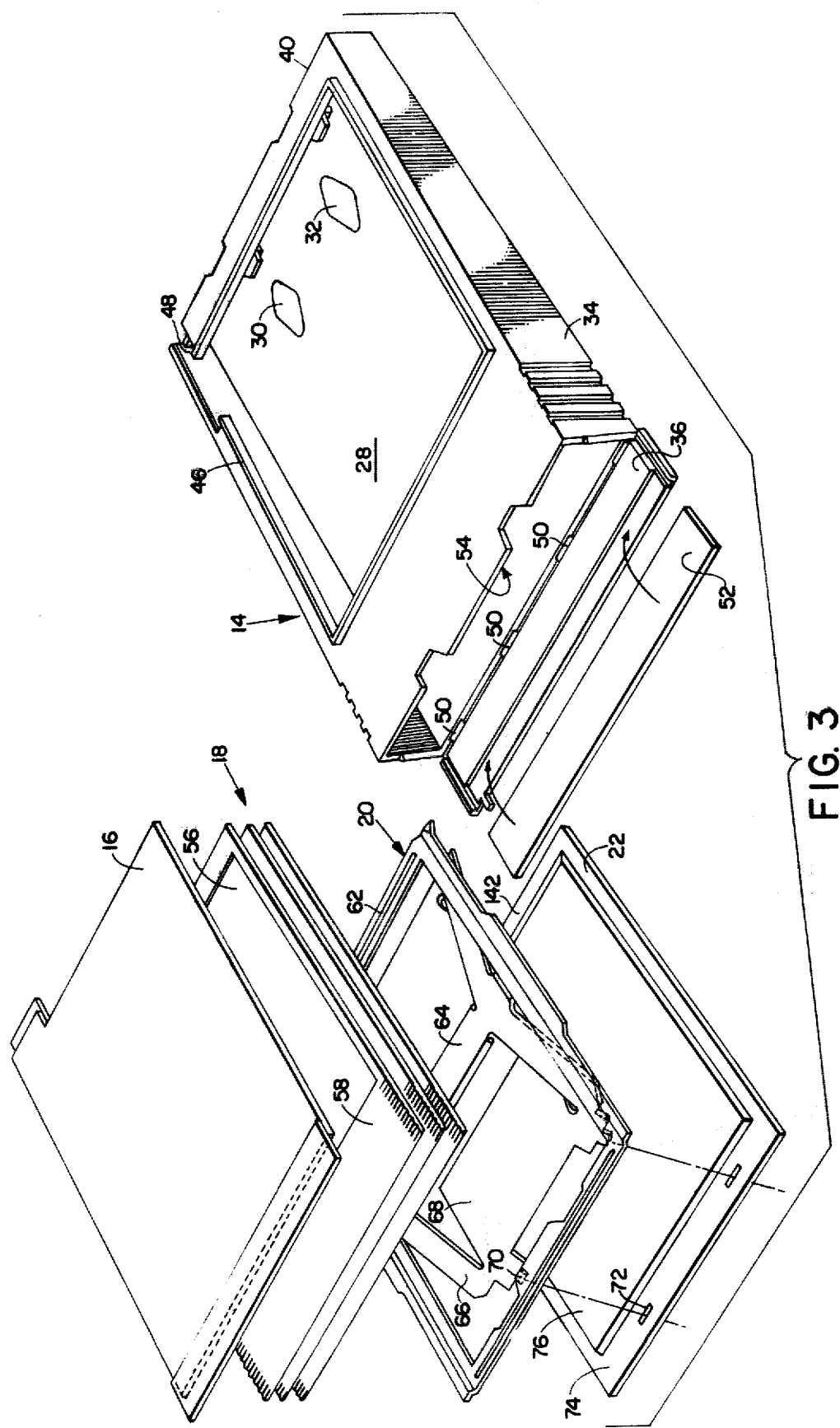
FIG. 3 is a perspective view of the film container and its contents shown in exploded fashion.
Figure 4:
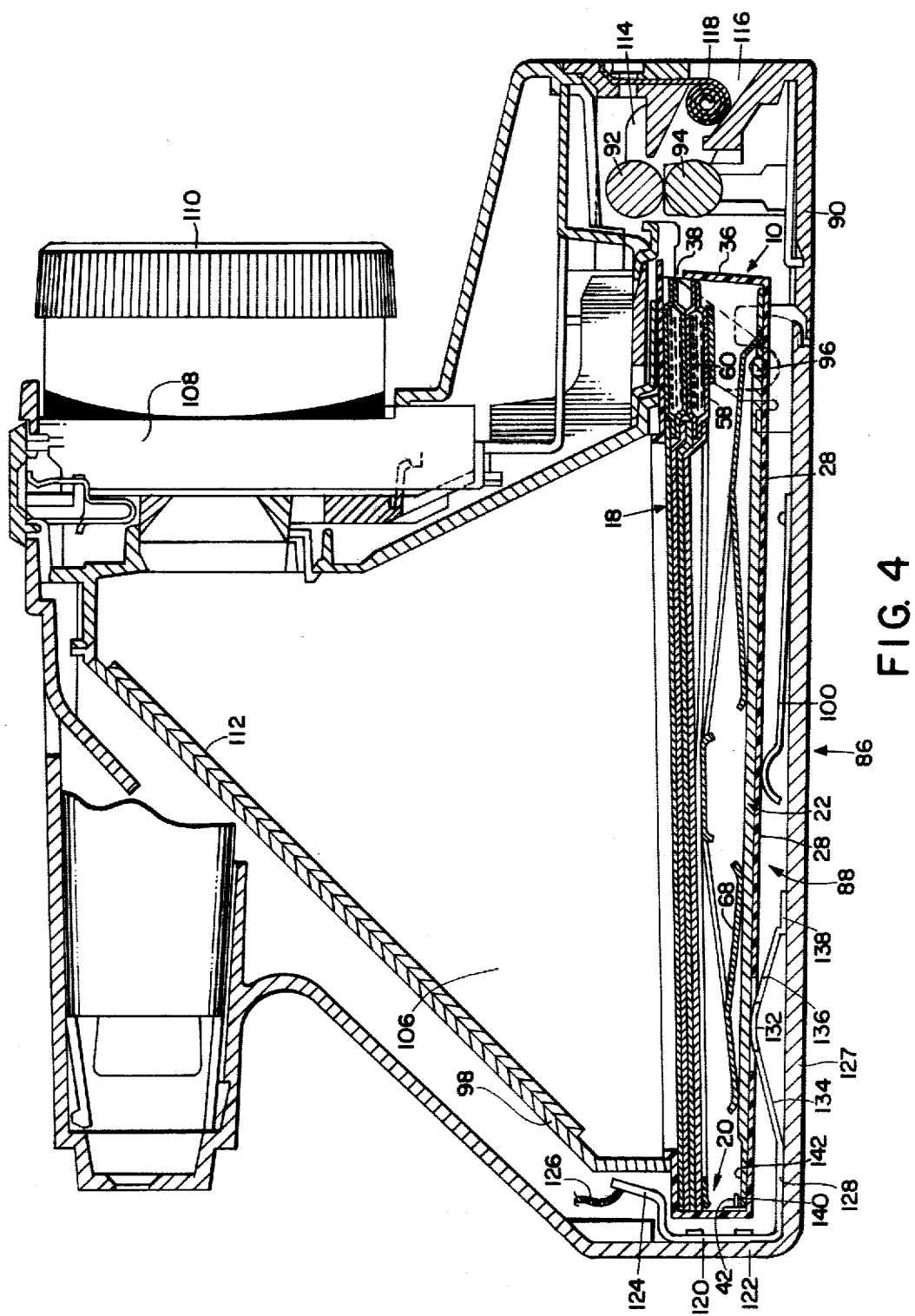
FIG. 4 is a side elevational view, partly in section, of a self-developing camera showing the film pack of FIG. 1 located at an operative position in the camera's receiving chamber.

FIGS. 1 and 3 show a photographic film pack or assemblage 10 suitable for use with battery energized photographic apparatus such as the compact, highly automated self-developing camera 12 shown in FIG. 4.

As best shown in FIG. 3, assemblage 10 includes a generally box-like film container 14 and its contents which include a dark slide 16; a plurality (preferably 10) of integral-type self-developing film units 18; a spring platen 20 and a substantially flat electrical battery 22.

The film container 14 is preferably of molded plastic construction and has thin, substantially planar walls. Any suitable light opaque thermoplastic material, such as polystyrene, may be used for its construction.

Figure 2:
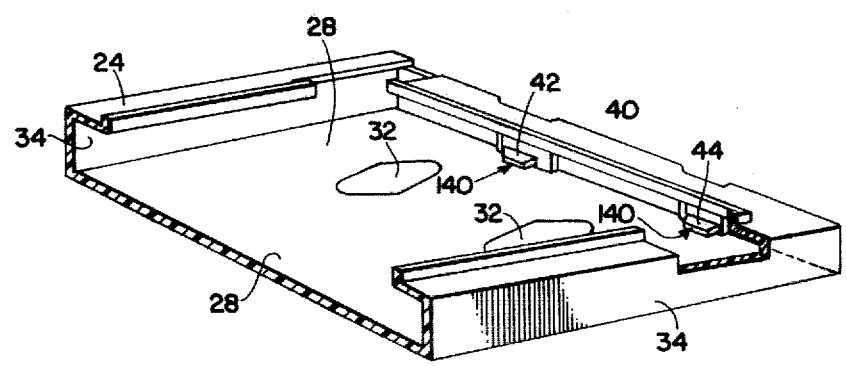
FIG. 2 is a perspective view of a trailing end section of a film container forming part of the assemblage having selected portions thereof cut away to show structure on the interior of the container rear wall for capturing a peripheral end section of a flat battery.

The major walls of container 14 include a forward wall 24 having an exposure aperture 26 therein; an oppositely-spaced rear wall 28 having a pair of generally diamond-shaped battery terminal access openings 30 and 32 therein; and a peripheral section joining the forward and rear walls and including a pair of lateral side walls 34, a leading end wall 36 having a film withdrawal slot 38 therein adjacent the leading edge of forward wall 24, and an oppositely spaced trailing end wall 40 having a pair of integrally molded projections 42 and 44 thereon see FIG. 2) for blocking battery movement as will be described in detail later herein.

The forward wall 24 includes an integrally molded upstanding rib 46 which defines the bounds of the generally square exposure aperture 26. Communicating with the left trailing end corner of aperture 26 is an elongated slot 48 which extends longitudinally along forward wall 24 and part way down trailing end wall 40 to provide access to the trailing edge of the forward-most film unit in the pack for a pick mechanism located in camera 12 for advancing an exposed film unit outwardly from container 14 through withdrawal slot 38.

As best shown in FIG. 3, when container 12 is initially molded the leading end wall 36 is integrally formed therewith in its open position, being connected along its bottom edge to the leading edge of rear wall 28 by a plurality of integrally molded flexible hinges 50. An opaque flexible plastic light shield 52 is secured to the interior side of leading end wall 36 along its upper edge so as to extend upwardly therefrom and forms a displaceable light seal in blocking relation to the withdrawal slot 38. Following the insertion of the stacked contents into container 14 through its open leading end 54, the leading end wall 36 is pivoted upwardly to its closed position as shown in FIG. 1 where it is bonded in place by any suitable process such as ultrasonic welding.

The contents of film container 14 are arranged in stacked relation in the order shown in FIG. 3.

The dark slide 16 is a cardboard sheet which blocks the exposure aperture 26 and also includes auxiliary flexible light shields at the leading and trailing ends for respectively light sealing withdrawal slot 38 and pick access slot 48. Once pack 10 is loaded into the light excluding environment of the camera receiving chamber, dark slide 16 is removed from container 14 through the film withdrawal slot 38 by the camera pick mechanism.

Located behind dark slide 16 is a stack of 10 integral-type self-developing film units which may be of the type disclosed in commonly-assigned U.S. Pat. No. 3,615,644. Following exposure of the generally square photosensitive image-forming area 56 of the forward-most film unit through exposure aperture 26, the film unit is advanced through withdrawal slot 38 and between a pair of pressure-applying rollers which rupture a pod 58 to release a fluid processing composition 60 (see FIG. 4) which is then distributed between a predetermined pair of layers within the film unit to initiate a well-known development and diffusion transfer process.

The spring platen 20 located between the stack of film units 18 and the flat battery 20 serves two functions. First, it provides an upwardly-directed force to the stack of film units 18 to maintain the forwardmost film unit in the stack at the exposure position where its uppermost surface is pressed against the interior surface of container forward wall 24 and it is also aligned with withdrawal slot 38. Secondly, spring platen 20 provides a downwardly-directed force on battery 22 to urge it towards the interior surface of container rear wall 28.

Structurally, platen 20 includes a generally rectangular upper frame section 62 which has a laterally-extending cross member 64 which leads to four downwardly-sloping legs 66. The bottom ends of the legs 66 are connected by longitudinally-extending flaps 68 which engage and press down on the upper surface of battery 22. Also platen 20 may include a pair of leading end tabs 70 which are intended to extend through aligned slots 72 in the battery base support member 74 and into appropriate receiving notches (not shown) in the interior surface of container rear wall 28 for the purpose of stabilizing the longitudinal location of battery 22 within container 14.

Figure 7:
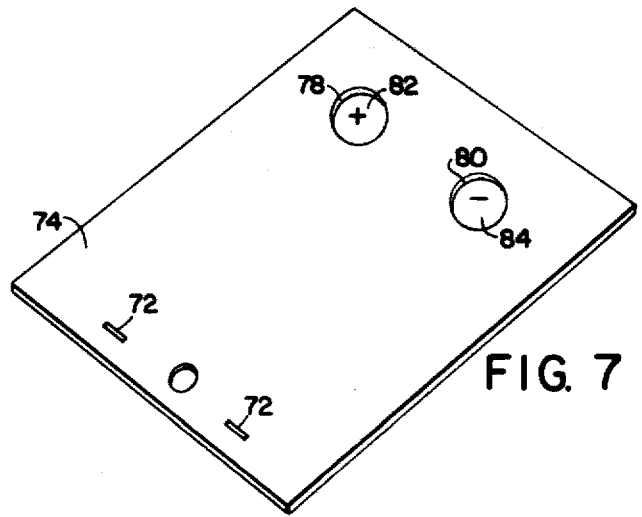
FIG. 7 is a rear perspective view of the flat battery showing a pair of battery terminals on the underside thereof.

In the illustrated embodiment, the flat battery 22 comprises a generally rectangular cardboard support base 74 which generally conforms to the interior dimensions of film container 14 and a slightly smaller 6-volt electrochemical multi-cell energy source or battery 76 mounted on the top surface of support member 74. As best shown in FIG. 7, the underside of support member 74, which overlies the interior surface of rear wall 28, has a pair of round apertures 78 and 80 therein providing access to positive and negative terminals 82 and 84, respectively, of the electrochemical battery 76. When battery 22 is located at its operative position overlying rear wall 28, terminals 82 and 84 are in facing registration with their corresponding access openings 32 and 30.

For an example of the illustrated battery 22, see commonly-assigned U.S. Pat. No. 3,877,045.

As used in this disclosure, the term "battery" is intended to encompass the energy source 76 and its packaging including the larger base or carrier support member 74. It will be understood that a battery which does not include such a support member 74 in its packaging scheme will also meet the definition.

Figure 5:
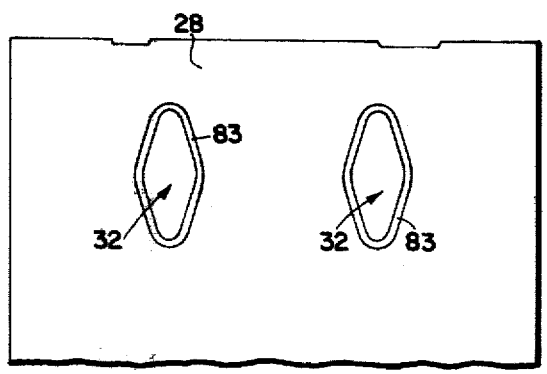
FIG. 5 is a plan view of the trailing end section the underside of the film container showing a pair of diamond-shaped access openings therein.

As best shown in FIGS. 2, 3 and 5, the battery contact access openings 30 and 32 are located in container rear wall 28 in much closer relation to the trailing end wall 40 than the leading end wall 32. Access openings 30 and 32 are generally diamond-shaped with their longer dimension extending in the longitudinal direction of the film container 14. The edges of rear wall 28 defining the bounds of these access openings are rounded at the corners to facilitate smooth entry and withdrawal of the later-to-be-described battery contacts in the camera and also are beveled inwardly, at 83, from the exterior to the interior surfaces of rear wall 28 to provide a camming surface for the contacts to slide over to further enhance smooth entry and withdrawal.

Those components of the film container 14 and its contents described up to this point are essentially the same as those described in more detail in the previously noted, commonly-assigned copending application U.S. Ser. No. 026,200, filed on Apr. 2, 1979 which is incorporated by reference herein.

The only difference between the film assemblage embodying the present invention and the film assemblage described in this copending application is the addition of the means for blocking movement of the battery away from interior surface of rear container wall 28 in response to an upwardly directed force applied thereto by the spring contacts in the camera chamber in the form of the integrally molded projections 42 and 44 which will be described later herein.

The highly automated self-developing camera 12 shown in FIG. 4 is typical of a variety of related photographic apparatus, including motorized camera backs, configured to receive film pack 10.

The camera housing includes a lower base section 86 having a chamber 88 therein for slidably receiving and supporting film pack 10 at a fully inserted operative position as shown. Access to chamber 88 is provided by pivoting a forward housing 90, mounting a pair of juxtaposed motor-driven pressure-applying rollers 92 and 94 therein, downwardly in a counterclockwise direction about pivot pin 96 to unblock the open leading end of receiving chamber 88.

When the film container 14 is fully inserted, its forward wall 24 is urged against the bottom peripheral edge of an internal cone structure 98 by means of a pack support spring 100 that engages the exterior surface of container rear wall 28. Also, a pair of battery contact members 102 and 104 having their main portions thereof laterally spaced in longitudinally-extending parallel relation so as to be aligned with the access openings 30 and 32 make contact with the battery terminals 84 and 82 to electrically connect battery 22 to various battery energized systems within camera 12 including the exposure control system and a motor drive system for driving the rollers 92 and 94 and the film advancing pick mechanism (not shown).

The exposure aperture 26 in the top wall 24 of container 14 faces the interior of an exposure chamber 106 defined by cone 98. When pack 10 is supported at this operative position, the forwardmost film unit in container 14 is located at the camera film plane.

Upon actuation of a camera cycle start button (not shown) by the operator, a shutter in housing 108 opens permitting image forming light passing through objective lens 110 to impinge upon an inclined mirror 112 mounted on a rear sloping wall of cone 98. The mirror 112 reflects the light downwardly through exposure aperture 26 to expose the forwardmost film unit. The exposure interval is automatically controlled by a photocell circuit which monitors scene lighting condition. Upon operation of the shutter to terminate the exposure interval, an electrical motor 114 is energized and through a gear trim (not shown) rotatably drives the rollers 92 and 94 to effect the advancement of the exposed film unit 18 therebetween and also effects operation of the pick mechanism which advances the film unit forwardly through withdrawal slot 38 into the bite of the rollers. As the film unit advances between the rollers, the fluid 60 is released from pod 58 and is distributed between predetermined layers of the film unit to initiate a development and diffusion transfer process. From the exit side of the rollers, the film unit 18 is advanced out of the camera housing through an exit opening 116 to the exterior of the camera. Typically, a coiled retractable light shield 118 is provided in opening 116 for temporarily covering the photosensitive surface until the processing fluid 60 is fully distributed to prevent fogging.

For representative examples of such photographic apparatus see commonly-assigned U.S. Pat. No. 3,714,879; 3,750,551; 3,979,762; 4,032,936; 4,052,728; and 4,134,655.

Figure 6:
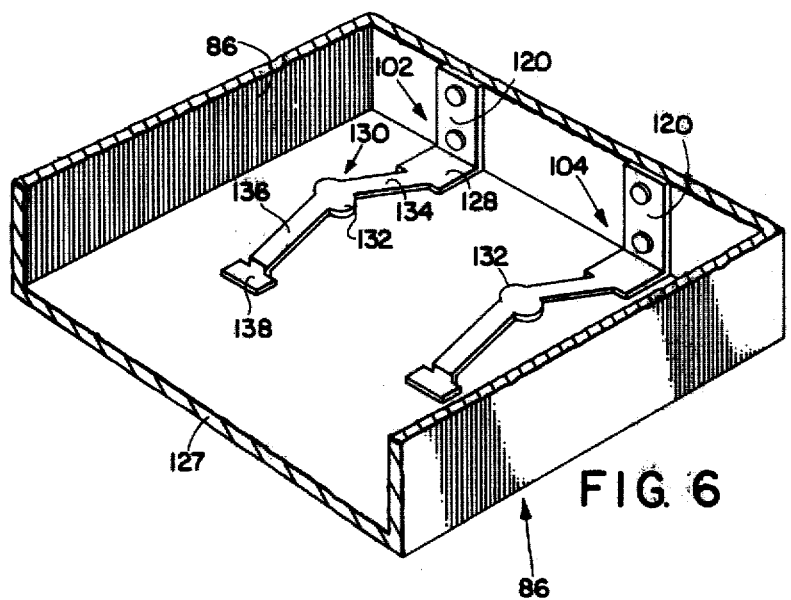
FIG. 6 is a perspective view of a pair of battery contact members located in the trailing end portion of the receiving chamber of the camera shown in FIG. 4.

As best shown in FIG. 6, the battery contact members 102 and 104 are stamped piece parts which may be formed from any suitable electrically conductive spring material, such as copper.

The profile shape of each of the battery contact members 102 and 104 is best shown in FIG. 4. Each such contact member includes a vertical mounting section 120 which is fixedly secured to the upstanding trailing end wall 122 of base housing section 86 by any suitable means such as the illustrated rivets or snap fit coupling devices.

Extending inwardly and then upwardly from the upper end of section 120 is a terminal section 124 having a wire 126 electrically connected thereto and representing the electrical connection between the camera's electrical system and the battery contact member.

Extending forwardly along the interior surface of the bottom wall 127 of housing section 86, from the bottom end of section 122, is an integrally formed flat trailing end stabilizing section 128. Extending forwardly from section 128 is an integrally formed upstanding, narrower, convexly bowed leaf spring section 130 having a wider coined battery contact 132 at its apex between the trailing and leading leg portions 134 and 136 respectively of leaf spring 130. Extending forwardly of the leading end of leg 136 is a integrally formed, wider, flat, forward stabilizing section 138 with which rests on and is free to slide over the interior surface of wall 127 to accommodate flexing of leaf spring 130.

In some earlier models of these self-developing cameras, the upper surface of battery contacts 132 is coated with a high-conductive metal such as silver. Most of the battery contacts 102 and 104 are presently manufactured without this additional silver coating. In any event, the film pack 10 is configured for use with either type of battery contact construction.

As the trailing end of the film pack 14 is inserted into chamber 88, the trailing end of the underside of container rear wall 28 first engages and depresses the pack support spring 100. As the pack is further introduced into chamber 88, the underside of rear wall 28 engages the upwardly sloping leg sections 136 of battery contact members 102 and 104. In response to further rearward movement of the pack into chamber 88, the leafed spring sections 130 are compressed downwardly allowing aligned sections of rear wall 28 to slide over the battery contacts 132. As the V-shaped trailing ends of access openings 30 and 32 become wider, the contacts 132 slide upwardly along the beveled edges 83 which cam them smoothly toward the terminals 84 and 82. Near the center of openings 30 and 32, the battery contacts 132 clear the beveled edges 83 and are urged by the leaf spring sections 130 upwardly into contact with battery terminals 84 and 82. At this point, film pack 14 is at its fully inserted operative position as shown in FIG. 4.

When the container is withdrawn in the opposite direction, the contacts 132 are cammed out of the access openings by the beveled edges 83 and the trailing end of rear wall 28 engages the upwardly sloped rear legs 134 to compress the leaf spring sections 130 to facilitate withdrawal of pack 10.

As noted earlier, when the film container 14 is fully loaded with ten film units 18, the spring platen 20 is in maximum compression and its spring force pushing downwardly on the battery 22 substantially exceeds the spring force of the battery contact members 102 and 104 pushing upwardly on the battery terminals so that the battery 22 is firmly urged and retained against the interior surface of container rear wall 28. This means that the depth of penetration of the contacts 132 into the container through access openings 30 and 32 required to make good electrical contact with the battery terminals 82 and 84 is at a minimum.

However, as the film units 18 are sequentially exposed and withdrawn from the container, the spring platen 20 expands accordingly and the downward force it exerts on the battery 22 progressively decreases as each succeeding film unit is withdrawn.

After 7 or 8 film units have been removed, the oppositely directed spring forces of the spring platen 20 and the battery contact members 102 and 104 are about in equilibrium. When the next film unit 18 is withdrawn, the battery contact members 102 and 104 provide the dominant force and, in the absence of the projections 40 and 42, they will move at least the rearward section of the battery having the terminals thereon upward slightly into the container to a new equilibrium position requiring a slightly greater depth of penetration by the battery contacts 132. Because the battery 22 is relatively stiff, the engagement by the battery contacts 132 tend to raise only the trailing end so that the battery pivots in a clockwise direction about the leading end of the battery which remains in engagement with the leading end of container rear wall 28.

The bow-shaped leaf springs 130 are substantially longer than the diamond-shaped access openings 30 and 32 thereby limiting the ultimate depth of contact penetration. This limit is imposed because those portions of the arcuate leaf spring legs 134 and 136, just forwardly and rearwardly of the contact 132, will engage or bottom out on the leading and trailing edges of the access openings 30 and 32.

If one of the battery contact members 102 and 104 is somewhat distorted from its original manufactured shape, there is a good possibility that it will bottom out while the other contact member has sufficient clearance for greater depth of penetration of the contact 132. In this case, the deeper penetrating battery contact 132 will move the battery upwardly within the container to a point where there is a loss of electrical contact between the contact 132 of the bottomed out contact members and the facing battery terminal. This interruption, of course, will disable operation of the camera's electrical system.

In order to prevent such movement of the battery away from the rear wall of the container, the film container 14, embodying the present invention, includes the pair of integrally molded projections 42 and 44 on the rear container wall 40 for overlying the trailing peripheral end section 142 of battery 22 (on support member 74) and blocking upward movement of at least the trailing end of the battery away from the access openings 30 and 32 in response to the upwardly directed force applied to the terminals 84 and 82 by the contact members 102 and 104.

Each of the projections or blocking members 42 and 44 extends outwardly over the interior surface of rear wall 28 in the longitudinal direction towards end wall 36 and includes on its underside, a substantially planar blocking surface 140 that is spaced above the trailing end interior surface of rear wall 20 so as to snugly receive the trailing end peripheral section 142 of battery 22 between surfaces 140 and rear wall 28 thereby blocking upward movement of the trailing end of battery 22 away from rear wall 28.

These surfaces 140 may be tapered slightly in the longitudinal direction to slope upwardly from the fixed to the free end of the projections to facilitate insertion of the peripheral end section 142 of battery support member 74.

Advantageously, these projections 42 and 44 may be integrally molded with the trailing end wall 40 with only minimum modification to the existing molds used to make film containers 14 that do not include such projections. Also, this construction of the projections 42 and 44 allows the contents of film container 14 to be slidably inserted thereinto in a stack, as is currently done, by an automatic stuffing machine because the trailing end section 142 will automatically slide under projections 42 and 44 with little or no modification to the packaging process.

With the trailing end of the battery adjacent access openings 30 and 32 restrained in this manner by projections 42 and 44, those skilled in the art will appreciate that because the battery cannot move away from the interior surface of rear wall 28, the depth of penetration of contacts 132 into the container through access openings 30 and 32 required to make good electrical contact with the battery terminals is at a minimum. Consequently, this widens the tolerances of the shape of the leaf springs 130 which can achieve such minimum penetration before the leaf spring portions, fore and aft of the contact 132, engage or bottom out on the longitudinal edges of the access openings. Thus, one of the spring contact members 102 or 104 may be inadvertently flattened out slightly without losing its ability to achieve the minimum penetration required for good electrical contact.

While in the illustrated embodiment a pair of projections 42 and 44 are used on the rear wall 40, those skilled in the art will appreciate that container 14 may include only a single projection on rear wall 40 for accomplishing the same purpose. Alternatively, one or more projections of this type may be formed or fixed on the interior side of the film container side walls 34 and project inwardly therefrom over rear wall 28 so that lateral marginal portions of battery 22 automatically would slide between the projections and the interior surface of rear wall 28 when the contents are inserted through the leading end of the film container 14 and thus perform the same function of blocking battery movement upwardly into the container in response to engagement by the battery contact members. However, in terms of the ease of modifying existing molds and adhering to traditional molding techniques, it is preferred to mold projections on the trailing end wall 40.

Those skilled in the art can readily appreciate that this invention may be embodied or practiced in still other ways without departing from the scope or essential character thereof. Therefore, the embodiment described herein are illustrative and not restrictive, the scope of the invention being indicated by the following claims, and all inventions which come within the meaning of these claims are intended to be embraced therein.

What is claimed is:

1. A photographic film assemblage for use with battery energized photographic apparatus of the type including a chamber for slidably receiving and supporting said assemblage at a fully inserted operative position and a pair of resiliently displaceable battery contact members in the chamber, each contact member including a convexly-bowed, electrically-conductive leaf spring having an upwardly facing battery contact at the apex of the leaf spring, said assemblage comprising:

a film container having a plurality of walls including a forward wall having an exposure aperture therein, a rear wall oppositely spaced from said forward wall and engageable with said battery contact members as said film container is inserted into the chamber for compressing said leaf springs so that aligned facing sections of said rear wall may slide over said battery contacts, and a leading end wall having a film withdrawal slot therein adjacent said forward wall;

means for defining a pair of generally diamond-shaped battery terminal access openings in said rear wall configured to be registered with the battery contacts when said film container is at said operative position thereby allowing said contacts to extend into said container under the bias of said leaf spring to a depth of penetration limited by engagement of portions of said leaf springs on opposite sides of said corresponding contacts with portions of said rear wall defining edges of said access slots;

a plurality of film units arranged in stacked relation within said container behind said forward wall so that when the forwardmost film unit is urged against the interior surface of said forward wall it is in position for exposure through said exposure aperture and subsequent advancement through said withdrawal slot;

a substantially flat electrical battery located within said container and having a pair of battery terminals on its rear surface which is configured to overlie the interior surface of said rear container wall with said terminals in facing registration with said access openings;

a spring platen located between the rear of said stack of film units and the forward surface of said battery for urging said stack towards said forward wall so that said forwardmost film unit is pressed against said forward wall interior surface; and means within said container engageable with a portion of said battery for blocking movement of at least that section of said battery having said terminals thereon away from said rear wall in the vicinity of said access openings in response to an upwardly directed force applied to said battery terminals by the spring biased contacts thereby minimizing the depth of penetration of said battery contacts into said container required for good electrical contact with said battery terminals and consequently widening the tolerances of the shape of said leaf springs which can achieve such minimum penetration before the leaf spring portions engage the edges of said access openings.

2. The assemblage of claim 1 wherein said blocking means includes at least one blocking member having a surface facing said rear wall of said container and being spaced therefrom a distance sufficient to admit at least an peripheral portion of said battery between said surface and said rear wall with a snug fit.

3. The assemblage of claim 2 wherein said blocking member is fixed to the interior of one of said plurality of container walls.

4. The assemblage of claim 3 wherein said container includes a trailing end wall oppositely spaced from said leading end wall and said one blocking member is fixed to the interior of said trailing end wall.

5. The assemblage of claims 3 or 4 wherein said container walls are of molded plastic construction and said blocking member is integrally molded with said corresponding wall.

6. The assemblage of claim 1 wherein said leading end wall of said container is initially located in an open position to allow said film units, spring platen and battery to be slidably inserted into said container through a leading end opening and said blocking means includes at least one blocking member inside said container and including a surface spaced from said rear wall to allow an end portion of said battery to be slidably inserted between said surface and said rear wall with a snug fit when the contents are inserted into said container.

7. The assemblage of claim 6 wherein said plurality of container walls includes a trailing end wall opposite said leading end wall, said access openings are closer to said trailing end wall than to said leading end wall and said blocking member includes a projection on said trailing end wall extending out over said rear wall in the direction of said leading end wall and said blocking member surface is on the underside of said projection facing said rear wall so as to overlie a longitudinal end portion of said battery closest to said access openings.

* * * * *